March 10, 1936.  H. D. GEYER ET AL  2,033,238

FROZEN CONFECTION

Filed June 15, 1932  2 Sheets-Sheet 1

Inventors
HARVEY D. GEYER
WALLACE S. WHITTAKER
By Spencer Hardman & Fehr
their Attorneys March 10, 1936. H. D. GEYER ET AL 2,033,238
FROZEN CONFECTION
Filed June 15, 1932 2 Sheets-Sheet 2

Inventors
HARVEY D. GEYER
WALLACE S. WHITTAKER
By Spencer Hardman & Fehr.
Their Attorneys Patented Mar. 10, 1936

2,033,238

UNITED STATES PATENT OFFICE 2,033,238

FROZEN CONFECTION

Harvey D. Geyer and Wallace S. Whittaker, Dayton, Ohio, assignors, by mesne assignments, to General Motors Corporation, Detroit, Mich., a corporation of Delaware Application June 15, 1932, Serial No. 617,488

8 Claims. (Cl. 99—16)

This invention relates to confections, especially frozen or refrigerated confections, and the combination therewith of elastic containers in which they are dispensed to the consumer and from which they may be eaten.

A general object of this invention is to provide such a confection or other edible substance encased in a highly elastic container such as a toy elastic rubber balloon, which container may be readily slipped back from one end of the confection as it is being consumed and thus serve as a suitable and completely sanitary means for handling the confection while it is being eaten.

Another object of the invention is to provide a confection encased in an elongated toy rubber balloon which is applied to the confection only after the balloon has been telescoped upon itself to form a double-wall container closed at one end and open at its other end. This is accomplished by telescoping the closed end portion of the balloon within its open end portion so as to form an elastic double-wall container having a relatively large opening at one end thereof and then inserting the confection within said double-wall container through said opening.

Various other advantages result from such telescoping of the balloon upon itself, as follows: the filling opening in the telescoped balloon container is much larger than the ordinary narrowed opening in a toy balloon and hence the frozen confection or other substance may be much more easily inserted within the first than within the latter; also the frozen confection or other substance may be much more easily eaten from the double-wall container than from the untelescoped balloon due to the relative sizes of the openings through which the confection must come in each case; also the double thickness of rubber in the double-wall container provides much better heat-insulation for a frozen confection and so prevents excessive melting of the confection while it is being eaten and prevents it from being too cold for a small child's hands; also with the double-wall container the confection does not contact with the interior surfaces of the balloon, as such, and hence such interior surfaces do not have to be cleaned for sanitary reasons, the exterior surfaces of a balloon as normally made being much cleaner and freer of soap stone or other substances than the interior surfaces thereof; also the double-wall container readily lends itself to the insertion therein of a frozen confection having a waxed paper on other wrapping thereupon, due to the large and easily expandible opening therein, whereas this is not true with the narrowed filling neck of an ordinary toy balloon; also with the double-wall container the frozen confection or other substance cannot soil the interior surfaces of the balloon with drippings therefrom and hence the interior of the balloon does not have to be washed before it is inflated and used as a toy after the confection is removed therefrom.

Another object of the invention is to provide a frozen confection or other substance having a folded paper wrapping thereupon so folded as to provide a large number of heat-insulating air pockets between the paper folds, the paper-wrapped unit being snugly encased within an elastic rubber container which further aids the heat-insulating effect of the folded paper wrapping by substantially sealing said air pockets from the outside air.

Various other advantages result from the use of such additional paper wrapping, as follows: (1) the paper wrapping facilitates the opening of the package as illustrated in Fig. 6 of the drawings, since the rubber container may be rolled or slipped down to expose the confection simply by pulling back the paper wrapping; (2) the paper wrapping protects the rubber container against being wet or soiled by drippings from the confection as it is being eaten and hence the toy balloon is ready for use as soon as the confection is removed; (3) the flared out portions of the paper wrapping act as a cup and prevent dripping of the confection down upon the consumer's hand; (4) the folded paper wrapping with air pockets therein eliminates the necessity of other heat-insulating means to protect the consumer's hand from the cold or to prevent excessive melting of the confection as it is being eaten; (5) the paper wrapping may have a portion thereof projecting from the rubber container, which portion may be twisted to provide a simple and efficient complete seal for the open end of the container, as illustrated in Fig. 5 of the drawings; (6) the paper wrapping prevents all possibility of any odor or taste of rubber in the confection and hence this does not have to be guarded against in compounding the rubber for the balloons; (7) the paper wrapping prevents any tendency of a frozen or wet confection to pop out of the elastic rubber container during handling of the package or while the confection is being eaten.

Further objects and advantages of the present invention will be apparent from the following description, reference being had to the accompanying drawings, wherein a preferred embodiment of one form of the present invention is clearly shown.

In the drawings.

Like or similar reference characters refer to like or similar parts throughout the several views.

Figure 1:
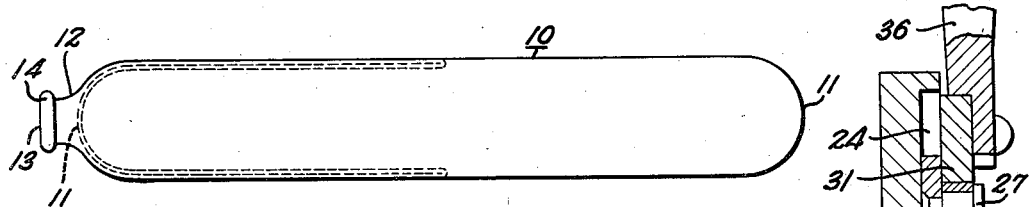
Fig. 1 is a side elevation of an ordinary elastic rubber toy balloon here chosen for illustrating this invention. The figure shows in dotted lines how the balloon may be telescoped upon itself to form a double-wall open-end container.

Numeral 10 designates the elongated rubber toy balloon in its non-telescoped or normal uninflated condition as shown in full lines in Fig. 1. Such a balloon 10 may be easily telescoped upon itself by holding it loosely in the hand and pressing the closed end 11 thereof against a stationary projecting pin of suitable size until the closed end 11 contacts with the narrowed neck 12 at the relatively small opening 13. The dotted lines in Fig. 1 illustrate the telescoped position of the closed end portion or bottom half of the balloon. The balloon in this telescoped condition will hereinafter be termed the double-wall container 15. Obviously the walls of container 15 are double the thickness of the walls of the simple balloon 10, and the end opening 16 therein is relatively large compared to the opening 13 in the simple balloon. In an ordinary cylindrical balloon the end opening 16 will be substantially the full transverse section of the balloon and since there is no thickened bead around opening 16, such as the usual bead 14 around the normal opening 13, such opening 16 may be easily expanded without injury to the rubber or giving it a permanent set.

Figure 2:
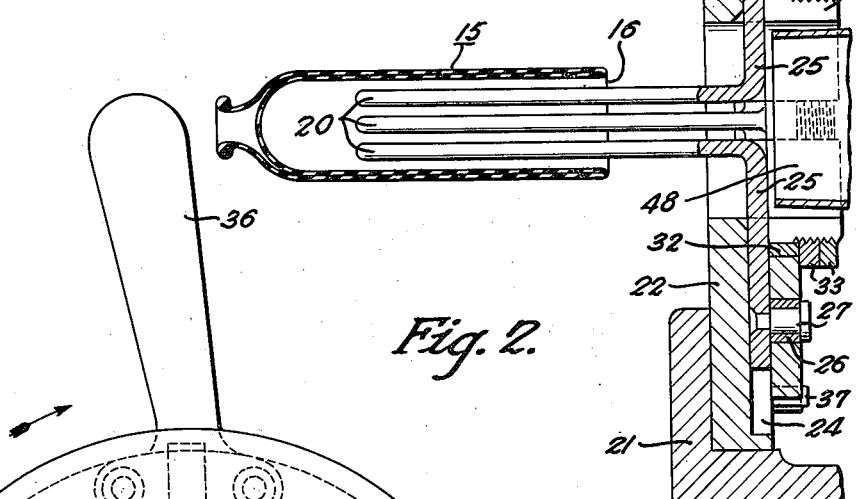
Fig. 2 shows in section the telescoped balloon inserted in place over its expanding pins and mechanism for actuating the expanding pins.
Figure 3:
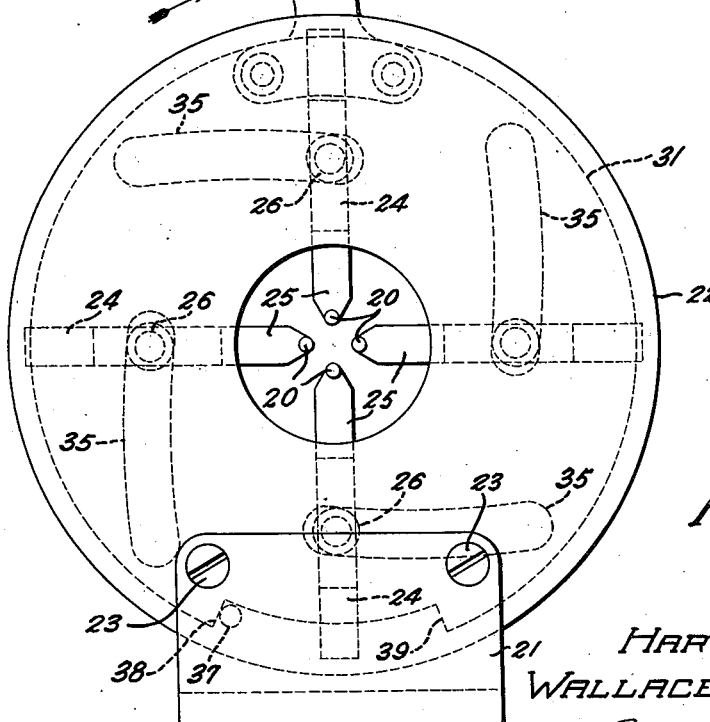
Fig. 3 is an elevation of the expanding mechanism looking in the direction of arrow 3 in Fig. 2. The balloon is not shown in this figure.
Figure 4:
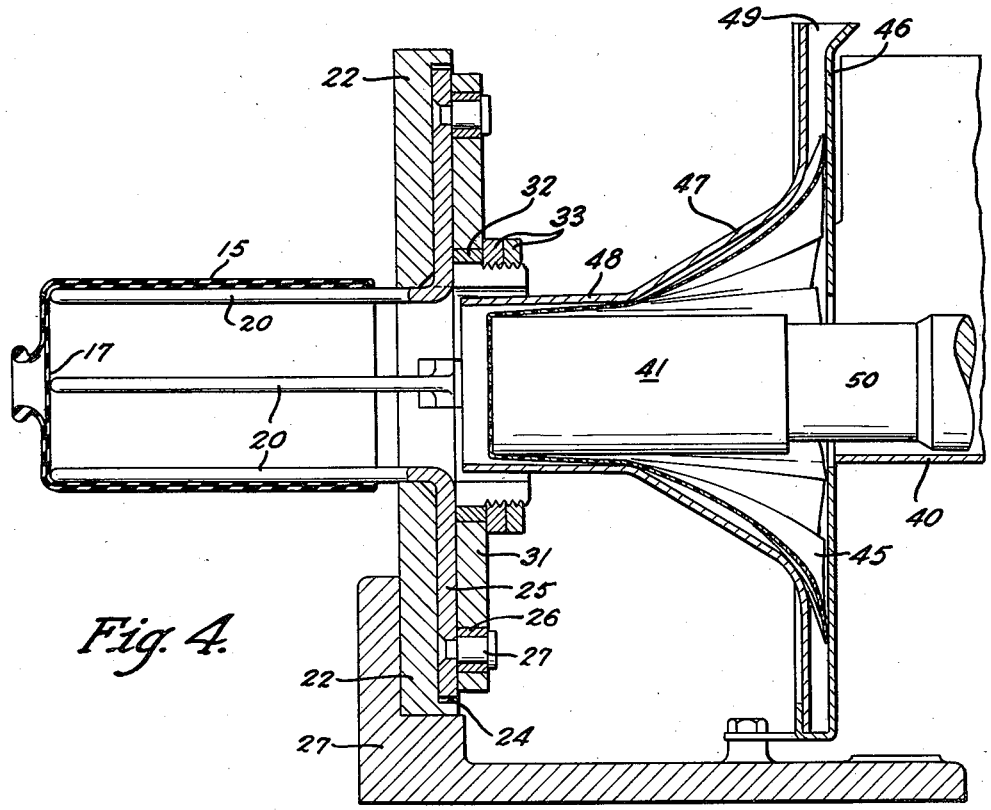
Fig. 4 shows the telescoped balloon fully expanded by the expanding mechanism, and a cylindrical block of confection being inserted therein together with its paper wrapping which is being simultaneously folded thereupon as it passes through a flared tube.

The double-wall container 15 may be readily applied by hand over the several projecting expanding pins 20 (four being illustrated) of the expanding mechanism, as shown in Fig. 2. This mechanism comprises a base 21 having a stationary plate 22 rigidly fixed thereto by screws 23. Plate 22 has four radially extending guide slots 24 therein within which the four legs 25 of the four expanding pins 20 slide radially. Each of the four legs 25 has a cam roller 26 rotatably mounted upon a pin 27 which is suitably fixed to the leg 25, such as by riveting it thereto as illustrated in Fig. 2. Guide plate 22 has a laterally projecting annular hub portion 30 integral therewith or suitably fixed thereto. An annular cam plate 31 is rotatably mounted upon the hub 30, sliding upon the spacer bushing 32 which is clamped to the hub 30 by means of the threaded rings 33. Cam plate 31 has four radially inclined cam slots 35 therein in which the cam rollers 26 fit. Now when cam plate 31 is rotated by means of the handle 36 in a clockwise direction as viewed in Fig. 3, the cam rollers 26 riding in cam slots 35 will cause the legs 25 and their attached expanding pins 20 to be moved radially outwardly. The outermost or fully expanded position of the pins 20 is shown in Fig. 4. Preferably the rotary movement of cam plate 31 is limited by the stationary stop 37. When the expanding pins 20 are in their closed position the shoulder 38 on cam plate 31 abuts the stop 37 (see Fig. 3) and when pins 20 are in the outermost or fully expanded position the shoulder 39 abuts the stop 37. Preferably a suitable spring (not shown) is attached to cam plate 31 to automatically return the mechanism to the position shown in Fig. 3 after the operator releases the handle 36.

The mechanism shown in Fig. 4 also comprises a holder 40 for the block 41 of frozen confection, or other substance, which is to be wrapped. Holder 40 holds the block 41 substantially axially aligned centrally with the four expanding pins 20. A stationary paper holder 45 is located immediately in front of the confection holder 40 and comprises a relatively narrow pocket into which a flat sheet of waxed paper of suitable size may be easily dropped until it is centrally located with the confection block 41 when lying by gravity within the holder 40. The side 46 of the paper holder 45 adjacent the holder 40 may be flat with a suitable central opening therein, as shown in Fig. 4, while the side toward the expanding mechanism flares out and forms a funnel 47 which preferably terminates in a tubular portion 48 located closely adjacent the expanding pins 20.

Figure 5:
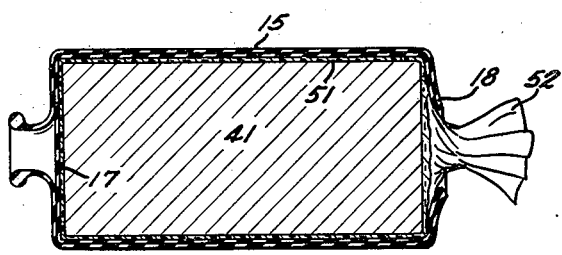
Fig. 5 shows the finished cylindrical package in longitudinal section, except the twisted portion of the paper wrapping is shown in elevation.

In operation, the confection block 41 is positioned upon the holder 40, preferably by sliding or rolling down a suitable chute upon the holder 40. A sheet of waxed paper, or other suitable paper is dropped within the pocket 45 through the open top 49 therein and rests by gravity upon the bottom of pocket 45, where the paper sheet will be centrally located with the confection block 41 in holder 40. A suitable horizontal reciprocating ram or plunger 50 is then moved against the confection 41 from the right as shown in Fig. 4 and presses the confection 41 against the paper sheet, thereby causing the paper sheet to be folded up around the confection by the funnel shape 47. Preferably the funnel 47 has flutes or corrugations therein which cause a series of substantially uniform creases or folds in the paper sheet as it is being folded back around the confection 41. Plunger 50 forces the confection 41 with the paper 51 folded thereupon directly through the aligned tubular portion 48, and thence into the expanded rubber container 15 which at this time is held upon the expanding pins 20. When the confection 41 contacts with the closed end 17 of container 15, further movement to the left of plunger 50 forces the container 15 endwise from the pins 20. The friction hold of pins 20 upon the stretched rubber container 15 causes the container to be considerably axially elongated so that when container 15 is slipped from the ends of pins 20 it is somewhat longer than the block 41. This causes the protruding open end portion 18 of container 15 to close in around the block 41 somewhat as shown in Fig. 5 and provide a partial rubber covering for this end of block 41. The friction of the radially stretched rubber on the paper covering 51 prevents the rubber container 15 from returning to its normal axial length so that when the container 15, paper wrapping 51, and block 41 are forced from the ends of pins 20 by plunger 50, the package will be substantially as shown in Fig. 5 except that the protruding paper ends 52 will not be twisted as there shown. Such twisting of the protruding ends 52 is preferably done by hand in a simple manner and this provides a complete sanitary seal for the confection. The package is then ready to be packed in cartons and stored. If the confection is a frozen confection, such as frozen flavored ices or ice cream, it should be maintained at a cold temperature substantially below its melting temperature while it is being wrapped as above described in order to prevent any surface melting thereof due to its contact with metal parts of the mechanism. The above described mechanism is adapted to be operated at such a rapid rate that each frozen block 41 remains in contact with metal parts thereof only a very short time and hence there is little chance for the confection to be heated up thereby. If desired the mechanism may be cooled down prior to beginning its operation by any suitable means such as by applying pieces of carbon dioxide snow to the metal parts which contact with the blocks 41 of frozen confection. During its operation the mechanism is maintained sufficiently cold by the series of confection blocks 41 which pass successively therethrough at a rapid rate.

Figure 6:
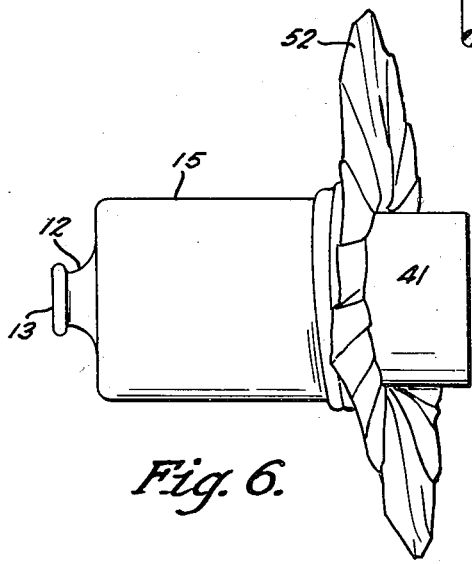
Fig. 6 illustrates how the container may be gradually pulled back from the confection to expose only a sufficient portion thereof to permit the consumer to bite it.

The package is dispensed to the consumer in the form shown in Fig. 5. It can be conveniently handled or carried by the consumer by holding the protruding paper portion 52 so that there is no tendency for the temperature of the hand to melt the confection or for the confection to make the hand uncomfortably cold even though it may be at a quite cold temperature, say 15° F. In order to expose only a portion of the confection, at a time while it is being eaten, the consumer first untwists the paper portion 52 and progressively pulls it back thus causing the rubber container 15 to progressively roll or slip back somewhat as shown in Fig. 6. Thus during the eating of the confection only a desired small portion thereof is exposed to the warm room temperature and hence the softening or melting of the confection may be so controlled that there will be no drip therefrom while it is being eaten. The outwardly flared paper portion, as shown in Fig. 6, also substantially prevents any possible drip from running down upon the container 15 or upon the consumer's hands. Thus the confection may be eaten by a young child in a cleanly manner. After the confection is eaten, or at least removed from the container 15, said container remains unsoiled by drip and may be immediately used as a toy balloon without the necessity of prior washing.

If desired a heat-insulating handle member, such as a cork bottle stopper (not shown), may be snugly inserted within the opening 13 of the balloon 10 either prior to or after the insertion of the confection 41 therein. Such a cork stopper will serve as a convenient heat-insulating handle for the confection while it is being progressively exposed for eating as above described in connection with Fig. 6.

While the form of embodiment of the present invention as herein disclosed, constitutes a preferred form, it is to be understood that other forms might be adopted, all coming within the scope of the claims which follow.

What is claimed is as follows:

1. A new article of manufacture comprising: an elastic rubber inflatable balloon having its closed end portion telescoped within its open end portion so as to form a double-wall container open at one end, and a congealed edible substance in said container.

2. A new article of manufacture comprising: an elastic rubber inflatable balloon having its closed end portion telescoped within its open end portion so as to form a double-wall container open at one end, and a congealed edible substance retained within said double-wall container by the elastic contractile tendency of said container.

3. A new article of manufacture comprising: an elastic rubber inflatable balloon having its closed end portion telescoped within its open end portion so as to form a double-wall container open at one end, and a congealed edible substance enclosed in a separate wrapper, said congealed substance and wrapper being snugly retained within said double-wall container by its tendency to contract thereupon.

4. A new article of manufacture comprising: an elastic rubber inflatable balloon having its closed end portion telescoped within its open end portion so as to form a double-wall container open at one end, and a frozen confection retained within said double-wall container by the elastic contractile tendency of said container.

5. A new article of manufacture comprising: an elongated elastic rubber inflatable balloon having its closed end portion telescoped within its open end portion so as to form a double-wall container open at one end, and a frozen confection snugly encased by said double-wall elastic container.

6. A new article of manufacture comprising: an elongated elastic rubber cover having an open and a closed end and having its closed end portion telescoped within its open end portion so as to form an elastic double-wall container open at one end thereof, and a congealed confection retained within said double-wall container by its elastic contractile tendency.

7. A new article of manufacture comprising: an elongated elastic rubber cover having an open and a closed end and having its closed end portion telescoped within its open end portion so as to form an elastic double-wall container open at one end thereof, and a congealed confection having a heat-insulating wrapper, said confection and wrapper being substantially encased by said double-wall container.

8. A new article of manufacture comprising: an elongated elastic rubber cover having an open and a closed end and having its closed end portion telescoped within its open end portion so as to form an elastic double-wall container open at one end thereof, and a frozen confection having a paper wrapper folded thereupon so as to provide relatively large air pockets therearound, said confection and paper wrapper being encased within said elastic container, whereby said elastic container completes the heat-insulating effect of said folded paper wrapper by substantially sealing said air pockets from the outside air.

HARVEY D. GEYER.
W. S. WHITTAKER.